United States Patent
Liu et al.

(10) Patent No.: US 11,309,018 B2
(45) Date of Patent: Apr. 19, 2022

(54) STABLE MEMORY CELL IDENTIFICATION FOR HARDWARE SECURITY

(71) Applicant: Regents of the University of Minnesota, Minneapolis, MN (US)

(72) Inventors: Muqing Liu, Minneapolis, MN (US); Chen Zhou, Minneapolis, MN (US); Keshab K. Parhi, Minneapolis, MN (US); Hyung-Il Kim, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 224 days.

(21) Appl. No.: 15/874,512

(22) Filed: Jan. 18, 2018

(65) Prior Publication Data

US 2019/0221254 A1    Jul. 18, 2019

(51) Int. Cl.
| | |
|---|---|
| *G11C 11/417* | (2006.01) |
| *H04L 9/32* | (2006.01) |
| *G06F 21/45* | (2013.01) |
| *G06F 21/44* | (2013.01) |
| *G06F 12/14* | (2006.01) |
| *G06F 21/73* | (2013.01) |

(52) U.S. Cl.
CPC ............ *G11C 11/417* (2013.01); *G06F 12/14* (2013.01); *G06F 21/44* (2013.01); *G06F 21/45* (2013.01); *G06F 21/73* (2013.01); *H04L 9/3278* (2013.01)

(58) Field of Classification Search
None
See application file for complete search history.

(56) References Cited

U.S. PATENT DOCUMENTS

| | | | | |
|---|---|---|---|---|
| 7,869,251 | B2* | 1/2011 | Venkatraman | G11C 17/18 365/104 |
| 8,219,857 | B2* | 7/2012 | Gebara | G11C 29/50 714/42 |
| 8,495,431 | B2* | 7/2013 | Gebara | G11C 29/50 714/42 |
| 8,848,477 | B2* | 9/2014 | Schrijen | G11C 7/24 365/226 |
| 8,880,954 | B2* | 11/2014 | Gebara | G06F 21/44 714/42 |

(Continued)

FOREIGN PATENT DOCUMENTS

WO    2012045627 A1    4/2012

OTHER PUBLICATIONS

'Physical Unclonable Functions for Device Authentication and Secret Key Generation' by G. Edward Suh et al., copyright 2007, ACM. (Year: 2007).*

(Continued)

*Primary Examiner* — Steven G Snyder
(74) *Attorney, Agent, or Firm* — Theodore M. Magee; Westman, Champlin & Koehler, P.A.

(57) ABSTRACT

A method includes setting an output of each memory cell in an array of memory cells to a same first value, decreasing power to the array of memory cells and then increasing power to the array of memory cells. Memory cells in the array of memory cells with outputs that switched to a second value different from the first value are then identified in response to decreasing and then increasing the power. A set of memory cells is then selected from the identified memory cells to use in hardware security.

15 Claims, 15 Drawing Sheets

(56) References Cited

U.S. PATENT DOCUMENTS

| | | | | |
|---|---|---|---|---|
| 9,262,256 | B2* | 2/2016 | Mathew | G06F 11/0793 |
| 9,350,330 | B2* | 5/2016 | Simons | H03K 3/037 |
| 9,436,845 | B2* | 9/2016 | Iyer | G06F 21/70 |
| 9,515,835 | B2* | 12/2016 | Mathew | H04L 9/3278 |
| 9,584,329 | B1* | 2/2017 | Trimberger | H04L 9/3278 |
| 9,762,400 | B2* | 9/2017 | Mathew | H04L 9/3278 |
| 9,787,481 | B2* | 10/2017 | Holcomb | H04L 9/3278 |
| 9,966,954 | B1* | 5/2018 | Yang | H03K 19/00315 |
| 10,038,564 | B2* | 7/2018 | Holcomb | H04L 9/3278 |
| 10,067,701 | B2* | 9/2018 | Lu | G11C 11/41 |
| 10,135,615 | B2* | 11/2018 | Seok | H04L 9/0866 |
| 10,324,641 | B2* | 6/2019 | Lu | G06F 3/0622 |
| 10,325,646 | B1* | 6/2019 | Trimberger | G11C 11/413 |
| 10,579,339 | B2* | 3/2020 | Suresh | H04L 9/0662 |
| 10,580,484 | B2* | 3/2020 | Yabuuchi | G11C 11/417 |
| 10,733,327 | B2* | 8/2020 | Lu | G06F 21/755 |
| 2009/0326840 | A1* | 12/2009 | Gebara | G11C 29/50 702/57 |
| 2010/0080035 | A1* | 4/2010 | Venkatraman | G11C 17/18 365/104 |
| 2012/0246494 | A1* | 9/2012 | Gebara | G11C 29/50 713/300 |
| 2013/0194886 | A1* | 8/2013 | Schrijen | G11C 7/24 365/226 |
| 2013/0234771 | A1* | 9/2013 | Simons | H04L 9/0866 327/215 |
| 2013/0247145 | A1* | 9/2013 | Gebara | G06F 21/73 726/2 |
| 2015/0178143 | A1* | 6/2015 | Mathew | G06F 7/00 714/5.1 |
| 2015/0347216 | A1 | 12/2015 | Kim et al. | |
| 2016/0065379 | A1* | 3/2016 | Holcomb | G09C 1/00 713/189 |
| 2016/0285639 | A1* | 9/2016 | Mathew | H04L 9/3278 |
| 2016/0337123 | A1* | 11/2016 | Seok | H04L 9/0869 |
| 2017/0017808 | A1* | 1/2017 | Kwong | G06F 21/73 |
| 2017/0038807 | A1* | 2/2017 | Bittlestone | G06F 1/26 |
| 2017/0111180 | A1* | 4/2017 | Mathew | H04L 9/3278 |
| 2017/0277457 | A1* | 9/2017 | Lu | G06F 3/0673 |
| 2017/0295026 | A1* | 10/2017 | Guilley | G09C 1/00 |
| 2018/0234258 | A1* | 8/2018 | Peffers | G06F 1/04 |
| 2018/0293052 | A1* | 10/2018 | Suresh | H04L 9/0662 |
| 2018/0307862 | A1* | 10/2018 | Kim | G06F 21/73 |
| 2018/0349050 | A1* | 12/2018 | Lu | G06F 3/0622 |
| 2019/0042480 | A1* | 2/2019 | Khatib Zadeh | G11C 29/44 |
| 2019/0074984 | A1* | 3/2019 | Shor | G11C 11/417 |
| 2019/0165956 | A1* | 5/2019 | Adham | G06F 21/73 |
| 2019/0190725 | A1* | 6/2019 | De | H04L 9/3278 |
| 2019/0305970 | A1* | 10/2019 | Satpathy | H04L 9/3278 |
| 2019/0312734 | A1* | 10/2019 | Wentz | H04L 9/3247 |
| 2019/0392179 | A1* | 12/2019 | Lu | G11C 7/20 |
| 2020/0084052 | A1* | 3/2020 | O'Connell | G11C 11/419 |
| 2020/0092117 | A1* | 3/2020 | Shor | H03K 19/003 |
| 2020/0356700 | A1* | 11/2020 | Lu | H03K 19/00315 |
| 2020/0403813 | A1* | 12/2020 | Suresh | G11C 11/419 |

OTHER PUBLICATIONS

'A Trustworthy Key Generation Prototype Based on DDR3 PUF for Wireless Sensor Networks' by Wenchao Liu et al., Published: Jun. 30, 2014. (Year: 2014).*

Devadas et al.. Design and Implementation of PUF-Based "Unclonable" RFID ICs for Anti-Counterfeiting and Security Applications, Proceedings of IEEE International Conference on RFID, pp. 58-64, 2008.

Herder et al., Physical Unclonable Functions and Applications: A Tutorial, Proceedings of the IEEE, vol. 102, No. 8, pp. 1126-1141, 2014.

Holcomb et al., Power-up SRAM State as an Identifying Fingerprint and Source of True Random Numbers, Proceedings of IEEE Transactions on Computers, vol. 57, No. 11, 14 pages, 2008.

Jain et al., A 32nm SRAM Reliability Macro for Recovery Free Evaluation of NBTI and PBTI, International Electron Devices Meeting, 4 pages, 2012.

Kim et al., An SRAM Reliability Test Macro for Fully-Automated Statistical Measurements of Vmin Degradation, Custom Integrated Circuites Conference, 4 pages, 2009.

Maes et al., Countering the Effects of Silicon Aging on SRAM PUFs, IEEE International Symposium on Hardware-Oriented Security and Trust, pp. 148-153, 2014.

Maiti et al., A Large Scale Characterization of RO-PUF, IEEE International Symposium on Hardware-Oriented Security and Trust, pp. 94-99, 2010.

Mathew et al., A 0.19pJ/b PVT-Variation-Tolerant Hybrid Physically Unclonable Function Circuit for 100% Stable Secure Key Generation in 22nm CMOS, IEEE International Solid State Circuit Conference, pp. 278-279, 2014.

Oren et al., On the Effectiveness of the Remanence Decay Side-Channel to Clone Memory-based PUFs, Cryptographic Hardware and Embedded Systems, vol. 8086, pp. 107-125, 2013.

Schroder, Negative Bias Temperature Instability: Road to Cross in Deep Submicron Silicon Semiconductor Manufacturing, Journal of Applied Physics, vol. 94, No. 1, pp. 1-18, 2003.

Skorobogatov, Flash Memory 'Bumping' Attacks, CHES, 15 pages, 2010.

Wikipedia, https://en.wikipedia.org/wiki/Remanence, accessed Oct. 27, 2017.

Xiao, Bit Selection Algorithm Suitable for High-Volume Production of SRAM-PUF, IEEE International Symposium on Hardware-Oriented Security and Trust, pp. 101-106, 2014.

Zhou et al., Soft Response Generation and Thresholding Strategies for Linear and Feed-Forward MUX PUFs, International Symposium on Lower Power Electornics and Design, 29 pages, 2016.

* cited by examiner

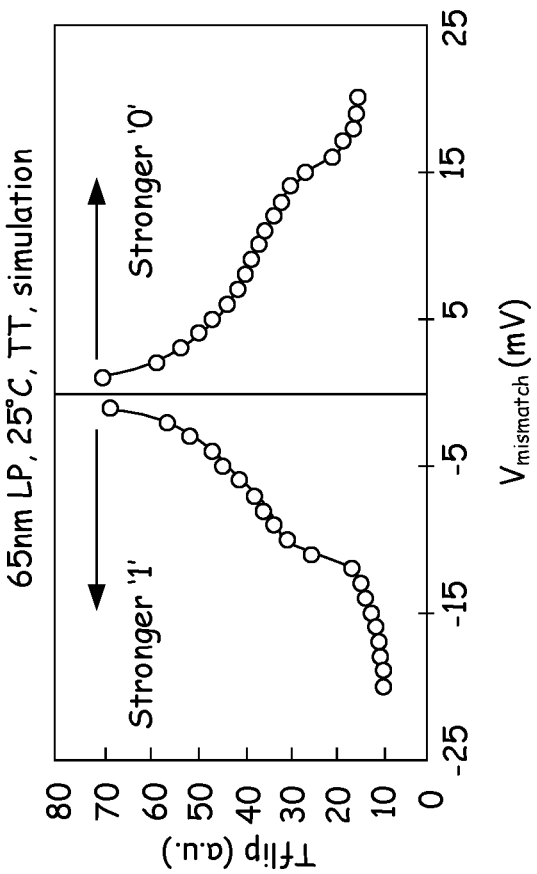
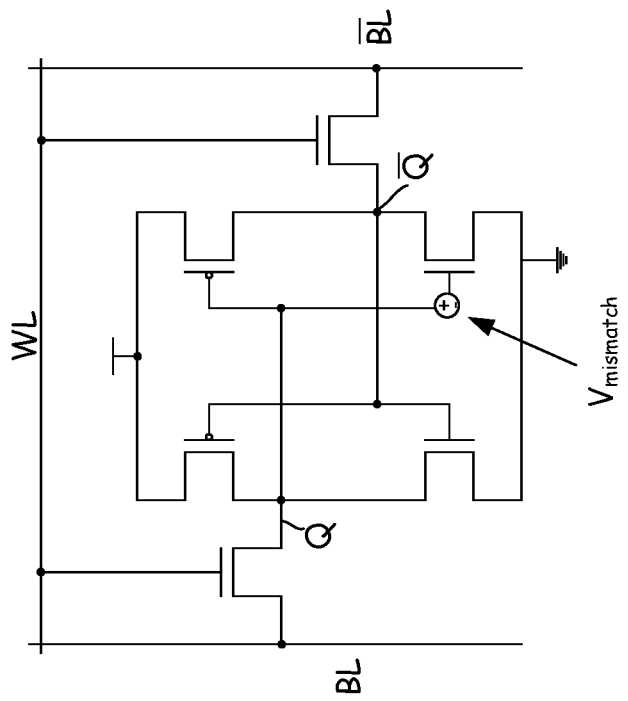
FIG. 4(a)
FIG. 4(b)

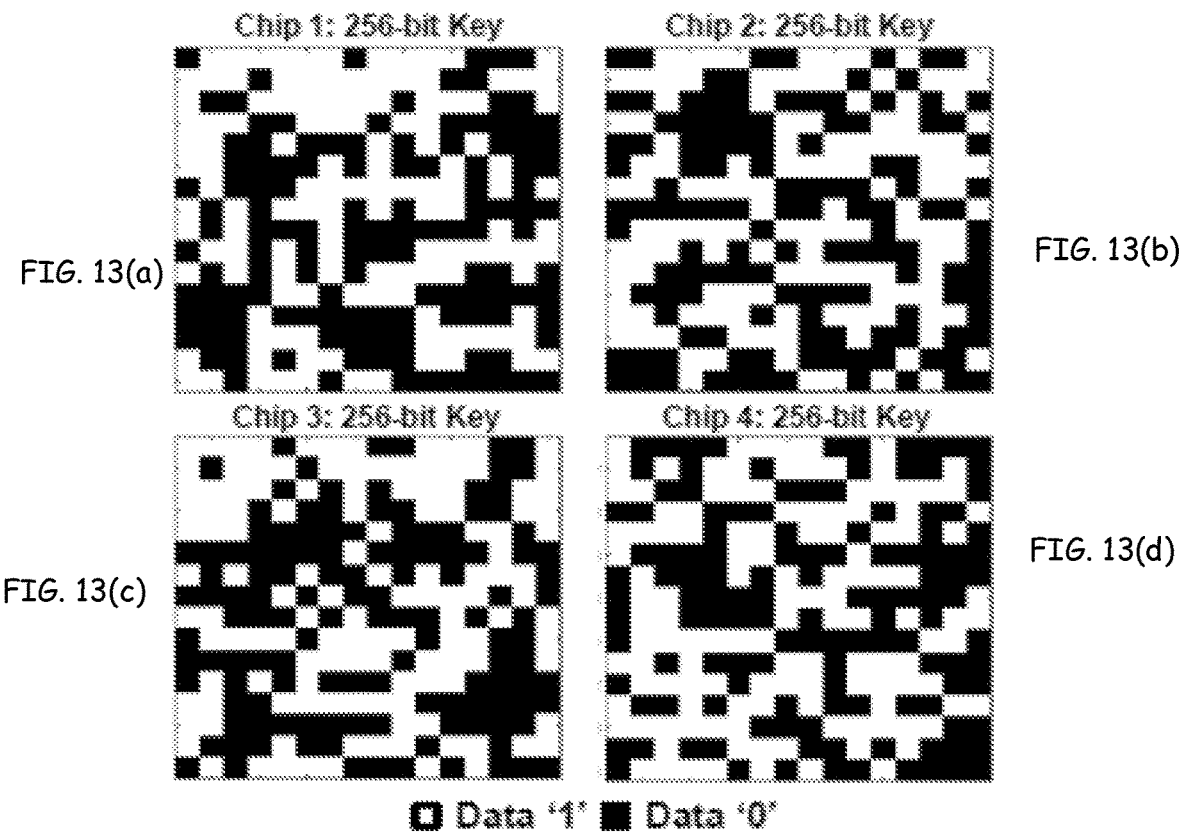
FIG. 13(a)
FIG. 13(b)
FIG. 13(c)
FIG. 13(d)
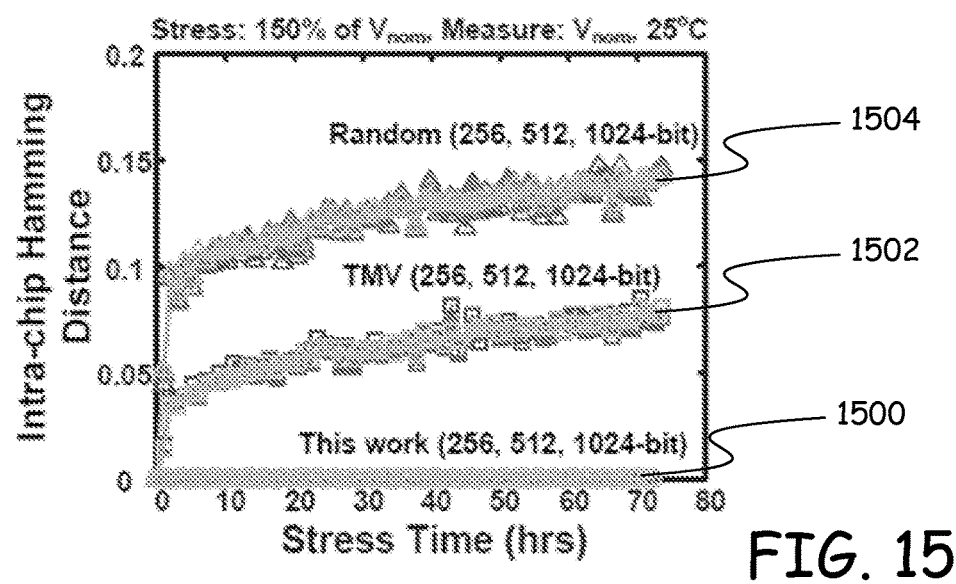
FIG. 15

STABLE MEMORY CELL IDENTIFICATION FOR HARDWARE SECURITY

This invention was made with Government support under CNS-1441639 awarded by the National Science Foundation. The Government has certain rights in this invention.

BACKGROUND

A Physical Unclonable Function (PUF) is a circuit that harnesses inherent manufacturing variations to generate a random and unique response to a challenge or input that is applied to the PUF. This unique response can then be used for many hardware security applications including authentication, anti-counterfeiting, IC metering, signature generation, and obfuscation.

Two categories of PUFs exist: "strong" PUF and "weak" PUF. Strong PUFs like Arbiter PUF and ring oscillator PUF can generate an exponential number of unique challenge-response pairs (CRPs), making them suitable for security applications without the use of encryption algorithms. Weak PUFs on the other hand, can only generate a linear number of CRPs and hence are used for key generation. Keys generated by weak PUFs can be used in conjunction with encryption algorithms for authentication applications. The main requirement for keys generated by weak PUFs is that their value should not change with temperature and voltage changes, or with device aging.

SUMMARY

A method includes setting an output of each memory cell in an array of memory cells to a same first value, decreasing power to the array of memory cells and then increasing power to the array of memory cells. Memory cells in the array of memory cells with outputs that switched to the opposite value are then identified in response to decreasing and then increasing the power. A set of memory cells is then selected from the identified memory cells to use in hardware security.

In accordance with a further embodiment, a system includes a memory having a plurality of memory cells and a memory controller and power controller coupled to the memory. A test controller is coupled to the memory controller and the power controller. The test controller applies tests to memory cells of the memory through the memory controller and the power controller to identify a time period of reduced power needed to change an output state of a desired number of memory cells in the memory.

In accordance with a still further embodiment, a method of identifying stable memory cells includes reducing power to a set of memory cells for a time period and then increasing power to the set of memory cells, wherein the time period limits how many memory cells have different output values after the power is increased compared to before the power is reduced. The addresses of memory cells that had different output values after the power is increased compared to before the power is reduced are stored as stable memory cells.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4($a$) is a circuit diagram of a SRAM memory cell for simulating the propensity of SRAM memory cells to flip states in response to brief power down periods.

FIG. 4($b$) is a graph showing the relationship between the voltage mismatch at the gates of two of the transistors of FIG. 4($a$) and the power down period required for the memory cell of FIG. 4($a$) to flip states.

FIGS. 7($e$)-7($h$) show a map of stable '0' cells for different power down periods.

FIGS. 13($a$)-13($d$) show keys generated from 4 different SRAM chips in accordance with one embodiment.

FIG. 14($b$) shows maps of value read from stable memory cells determine using a prior art TMV method (1000 power-ups) under various combinations of temperature and power up rate.

FIG. 14($c$) shows maps of value read from stable memory cells that are randomly selected under various combinations of temperature and power up rate.

FIG. 15 provides the hamming distance for stable memory cells determined in accordance with one embodiment, using the TMV method and using random selection after different stress times.

DETAILED DESCRIPTION OF ILLUSTRATIVE EMBODIMENTS

Figure 1:
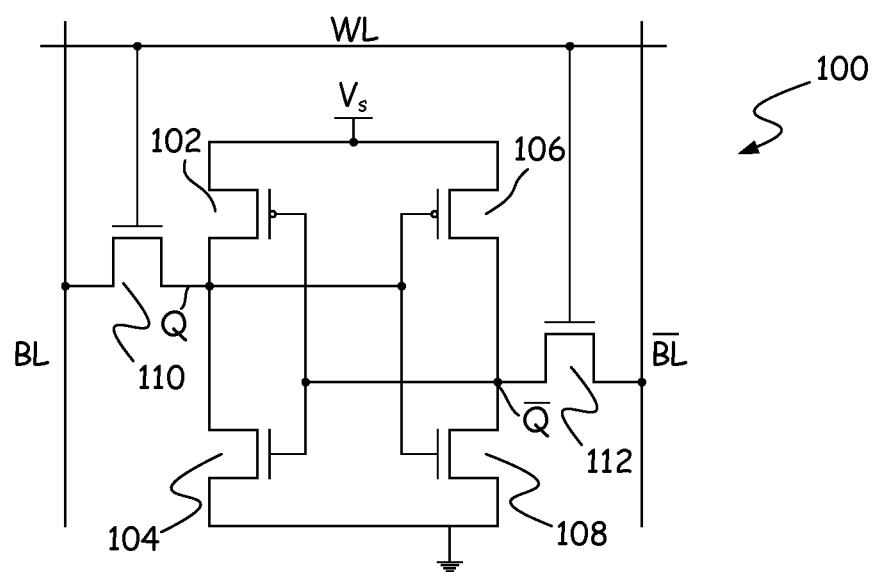
FIG. 1 is a circuit diagram of a SRAM memory cell in accordance with one embodiment.

Static Random Access Memory (SRAM) is an attractive option for weak PUFs since it is readily available in digital processors. Compared to dedicated PUFs such as an arbiter PUF or a ring oscillator PUF, the amount of effort needed to implement a SRAM PUF is negligible. The "challenge" to an SRAM PUF is the memory cell address while the "response" is the uninitialized power-up value of the cell. The layout of a 6 Transistor (6T) SRAM cell is perfectly symmetric and hence no systematic offset exists. Hence, the power-up state is determined by process variation-induced mismatch between the two cross-coupled inverters. The manufacturing variability is random, unclonable and uncontrollable, which gives each chip a unique key. The main design consideration for SRAM PUFs is making sure the key is 100% stable. An SRAM cell is considered to be stable if it generates the same response at power up regardless of the operating conditions such as the temperature of the SRAM or the voltage provided to the SRAM. This is difficult to achieve since the static mismatch of a SRAM cell may not always be large enough to overpower the random thermal noise under all operating conditions.

Temporal majority voting (TMV) is a popular technique for improving the stability of PUF responses. The basic principle is to repetitively test the PUF using the same challenge and take the majority value of the responses as the final output. Increasing the number of repetitive tests allows the tester to find keys that are more stable. The main drawback of TMV is that it usually involves a large number of tests (e.g. 100's or 1000's of power-ups for SRAM PUF), which is prohibitive in terms of test time and test hardware. Furthermore, even with such a large number of trials, the stability criterion cannot be made very stringent, so there's a high possibility that the stable cells found using TMV will become unstable in future evaluations. In some PUFs of the prior art, a combination of TMV, burn-in hardening and ECC circuits were used to meet the stability requirement. However, these techniques introduce significant hardware overhead. To make matters worse, TMV may have to be performed under extreme voltage and temperature conditions to ensure the responses are truly stable. This is very time consuming and difficult to implement in a high-volume production flow. In a second prior art system, a bit selection algorithm was proposed that utilizes just two test conditions; high-temperature/low-voltage and low-temperature/low-voltage. This is more efficient and less costly for selecting stable bits, however, it involves changing the test temperature which is undesirable. Error Correcting Codes (ECC) can be used to correct the unstable outputs using a software algorithm. However, ECC may leak secret information and introduce extra design complexity and communication overhead.

The instability of TMV selected cells stems from the marginally stable cells, i.e., cells that appear to be stable during TMV tests but become unstable under extreme environmental conditions. These cells are more stable than an average cell, but less stable than the strongest cells that consistently produce the same response. Finding the strongest cells in a large SRAM array requires a prohibitively large number of repetitive tests and may involve changing the voltage and/or temperature. To overcome the limitations of TMV, we propose a method for selecting the most stable cells in an SRAM array based on just two power-up tests. Compared to TMV, our approach reduces the test time and obtains more accurate information pertaining to the stability of cells. Experiment results from off-the-shelf SRAM chips show that the cells selected by our proposed strategy are 100% stable under extreme test conditions.

1. Data Remanence Based Stable Key Selection
1.1 Data Remanence Based Approach

FIG. 1 shows a circuit diagram of a 6 Transistor (6T) Static Random Access Memory cell 100 used in accordance with one embodiment. Transistors 102 and 104 form a first inverter with an output Q and transistors 106 and 108 form a second inverter with an output $\overline{Q}$, which is the inverse of Q. The outputs Q and $\overline{Q}$ have two stable states (Q='1', $\overline{Q}$='0') and (Q='1', $\overline{Q}$='0'), where an output in state '1' is at the positive supply voltage VDD and an output in state '0' is at a neutral voltage, which in some embodiments is ground.

The output of the inverter formed by transistors 102 and 104 is connected to the input of the inverter formed by transistors 106 and 108 and the output of the inverter formed by transistors 106 and 108 is connected to the input of the inverter formed by transistors 102 and 104. Output Q of the inverter formed by transistors 102 and 104 is connected to bit line BL by transistor 110, which provides access to Q when word line WL is at voltage VDD (state '1'). Output $\overline{Q}$ of the inverter formed by transistors 106 and 108 is connected to bit line $\overline{BL}$ by transistor 112, which provides access to $\overline{Q}$ when word line WL is at voltage VDD (state '1'). This structure produces stable output cell values Q and $\overline{Q}$ that can be switched by values placed on bit lines BL and $\overline{BL}$ when the write line WL is in state '1' or alternatively can be read on bit lines BL and $\overline{BL}$ when the write line WL is in state '1'. Transistors 102 and 106 are connected to the power bus $V_s$, which has a value of VDD when the SRAM is powered up and a neutral voltage such as ground when the SRAM is powered down.

Figure 2:
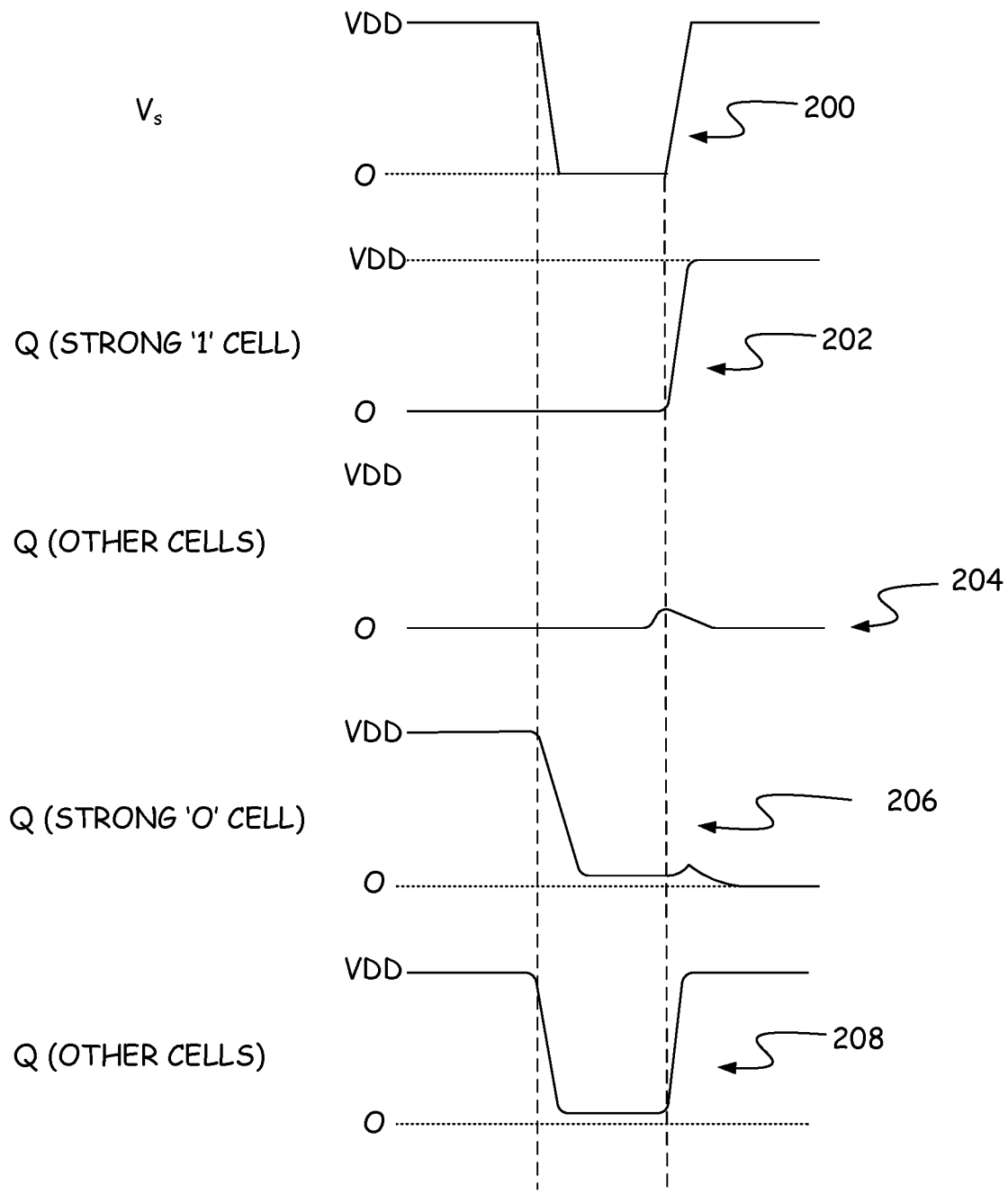
FIG. 2 is a timing diagram showing graphs of changes in memory cell outputs compared to changes in power applied to the memory cells.

When an array of 6T SRAM cells is powered down for a long period and then powered up, approximately half of the cells will have an output of Q=0 (neutral voltage) and half will have an output of Q=1 (VDD) regardless of the states of the SRAM cells before the power down. However, the present inventors have discovered that when all of the cells in the SRAM are set to a same output state and then the SRAM is powered down for a brief period before being powered up, only a small number of cells will switch states due to data remanence in many of the cells that do not switch. In other words, for a brief reduction in power, many of the SRAM cells will not lose their stored value. This can be seen in the graphs of FIG. 2 where graph 200 shows power bus $V_s$ being powered down and then powered up after a brief delay, graph 202 shows the output voltage Q of a SRAM cell that was in state Q='0' before the power down but that switched to state Q='1' when the cell powered up again (referred to as a strong '1' cell), graph 204 shows the output voltage Q of a SRAM cell that was in state Q='0' before the power down and that remained in state Q='0' when the cell powered up again (true for the vast majority of cells, which exhibit data remanence), graph 206 shows the output voltage Q of a SRAM cell that was in state Q='1' before the power down but that switched to state Q='0' when the cell powered up again (referred to as a strong '0' cell), and graph 208 shows the output voltage Q of a SRAM cell that was in state Q='1' before the power down and that remained in state Q='1' when the cell powered up again (true for the vast majority of cells, which exhibit data remanence).

Figure 3:
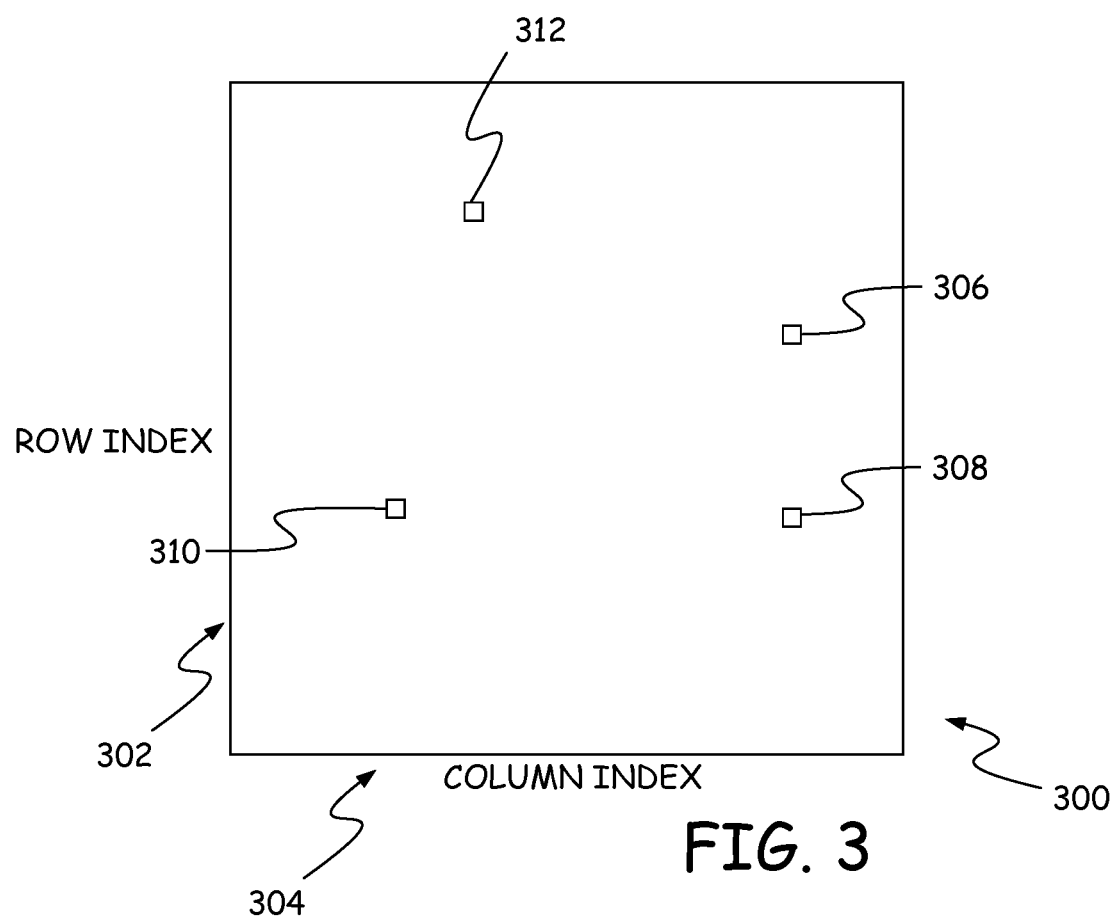
FIG. 3 is a map showing the locations of flipped cells in an array of SRAM cells after a brief power down of the array of SRAM cells.

FIG. 3 provides a map 300 of an array of SRAM cells, with each cell represented by a box at an intersection of a row index 302 along the vertical axis and a column index along the horizontal axis. As shown in FIG. 3, in an array of SRAM cells the number of cells that switch states, such as cells 306, 308, 310 and 312 can be identified based on the length of time that the SRAM is powered down before being powered up again.

The propensity of some cells to switch states after a brief power down can be simulated by introducing a voltage mismatch between the gates of two simulated transistors in one of the inverters as shown by $V_{mismatch}$ in FIG. 4(a). FIG. 4(b) provides a graph of the time period needed to change the state of the SRAM cell of FIG. 4(a) for various values of $V_{mismatch}$. As shown in FIG. 4(b), a large negative $V_{mismatch}$ will cause the cell to switch from Q='0' to Q='1' after a very brief period of low power while a large positive $V_{mismatch}$ will cause the cell to switch from Q='1' to Q='0' after a very brief period of low power.

The first few bits to flip after a brief power down period are ones that are strongly biased to the opposite value. For instance, if the entire array is initialized to 0's, the first cells to flip to 1's after the short power down period are the strongest '1' cells in the array. In traditional SRAM PUF power up operation, the response is only related to the inherent transistor mismatch of each SRAM cell. Data written to the cell doesn't affect the power up state because all storage nodes have fully discharged to an unbiased state due to leakage current. In other words, the data remanence is fully decayed. However, if the cell is powered back immediately after a power down, then the storage node data will revert to the previous data because the data remanence is very strong. If the power down time is long enough to make the data remanence comparable to the transistor mismatch, then some cells will revert to the previous data, while other cells will flip to the opposite value. We utilize this behavior to find the most stable '1's in a large SRAM array. Similarly, by writing '1' to all the cells in the SRAM array and asserting a short power down period, we can find the most stable '0's, which are the first cells to flip when the power is turned back on.

Figure 5:
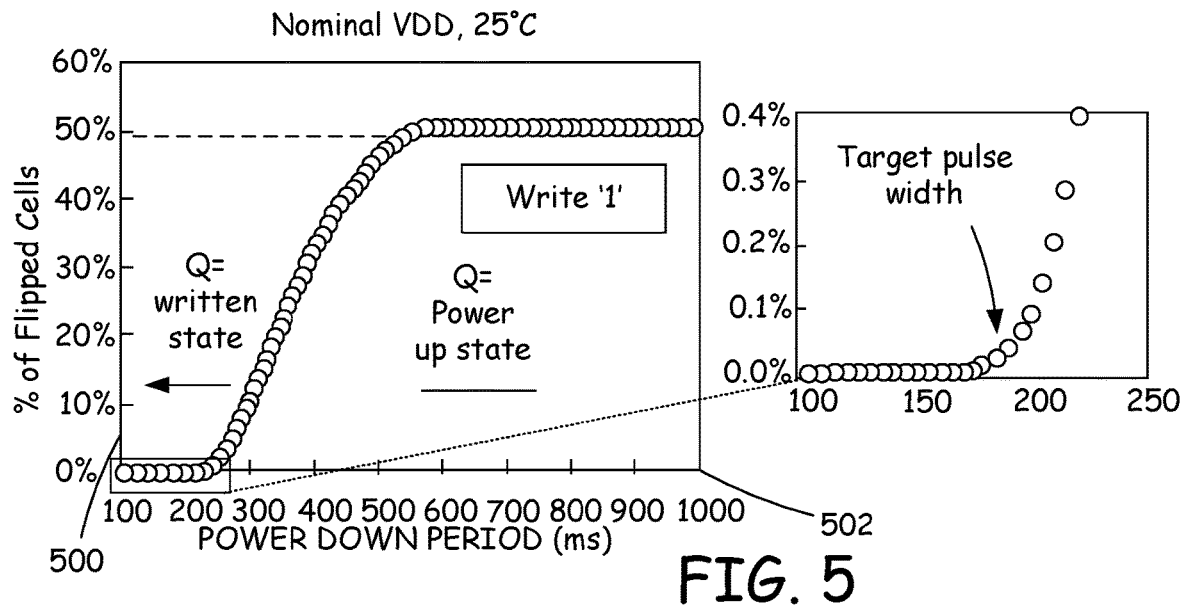
FIG. 5 is a graph showing the percentage of memory cells that flip from state '1' to state '0' for different power down periods.
Figure 6:
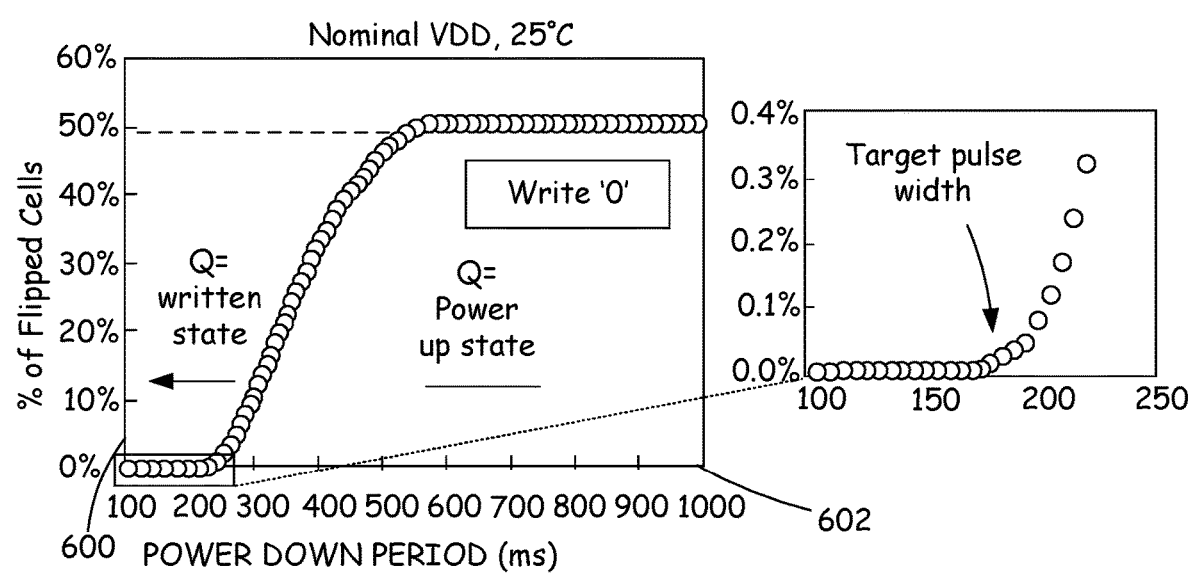
FIG. 6 is a graph showing the percentage of memory cells that flip from state '0' to state '1' for different power down periods.

As the period of the power down increases in length, more cells flip their state. This can be seen more clearly in the graphs of FIGS. 5 and 6. In FIG. 5 the percentages of cells in an array of 512,000 cells that switch from state Q='0' to state Q='1' are shown on vertical axis 500 and the length of time of the power down is shown along horizontal axis 502. In FIG. 6 the percentages of cells in the array of 512,000 cells that switch from state Q='1' to state Q='0' are shown on vertical axis 600 and the length of time of the power down is shown along horizontal axis 602. In FIGS. 5 and 6, the power down periods are from 100 ms to 1000 ms with the portion of the graph between 100 ms and 250 ms shown magnified.

In both FIG. 5 and FIG. 6, the cells start to flip after a power down period of about 130 ms. When the power down period increases to about 600 ms, the flip ratio reaches 50% which is the expected flip ratio if no data remanence is present in the array of cells. For authentication applications, we are only interested in finding the most stable '1's and '0's in the entire array, and therefore we need to select a power down period that is short enough so that only the most oppositely biased cells flip. This time is usually less than 200 ms, which is about 3 times shorter than the power down time required for a standard SRAM PUF evaluation (approximately 600 ms in our case). Although some of the embodiments require all SRAM cells to be written to '1' or '0' before the power down, the time needed to write data into the array is negligible compared to the power down time required to clear the data remanence in the SRAM. Moreover, some embodiments only require two tests to select the most stable cells in the SRAM array; one test for selecting stable '1' cells and the other for selecting stable '0' cells. TMV may require hundreds or more power ups to find the robustly stable cells and there must be at least 600 ms between two consecutive power-up tests. In short, compared to TMV, the proposed technique requires not only fewer power-ups (2 versus hundreds or thousands) but also shorter power down periods (~200 ms versus 600 ms) which significantly reduces the overall test time.

The SRAM chips tested to form the graphs of FIGS. 5 and 6 were fabricated in an ultra-low leakage technology, requiring a relatively long power down time to observe data remanence effects. We expect a much shorter data remanence time (e.g. microseconds) for SRAMs built in advanced CMOS technologies. The overall data remanence trends will be agnostic to the technology node.

Figure 7A:
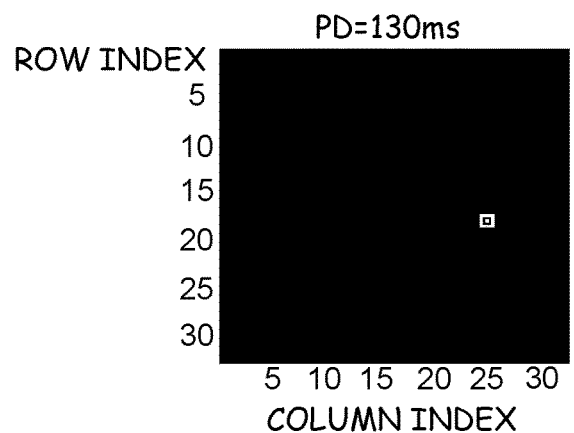
FIGS. 7($a$)-7($d$) show a map of stable '1' cells for different power down periods.
Figure 7B:
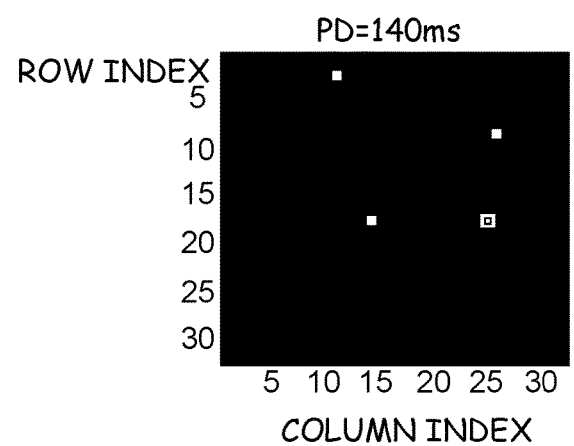
Figure 7C:
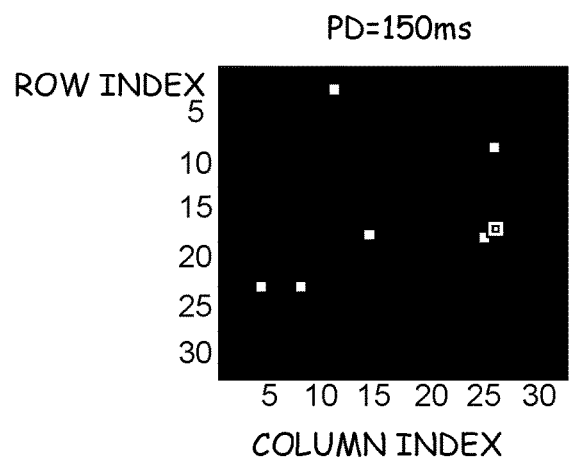
Figure 7D:
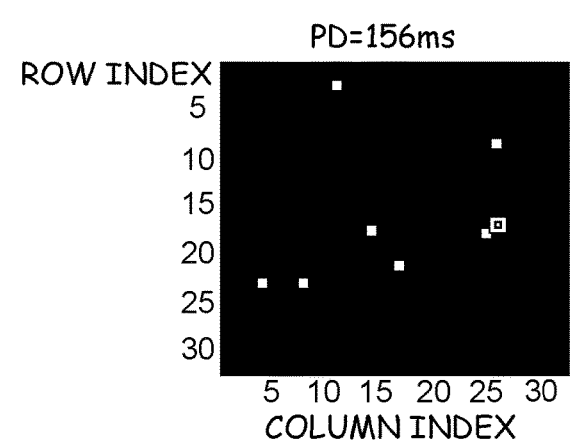
Figure 7E:
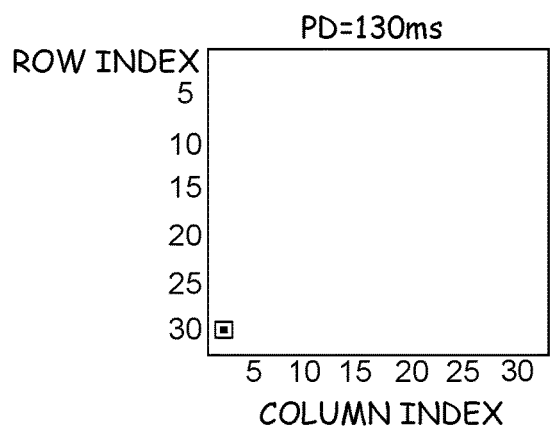
Figure 7F:
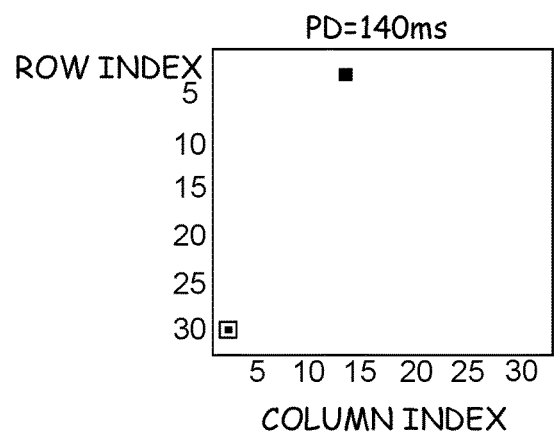
Figure 7G:
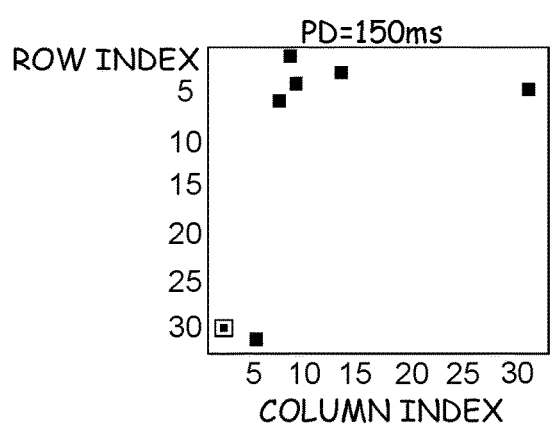
Figure 7H:
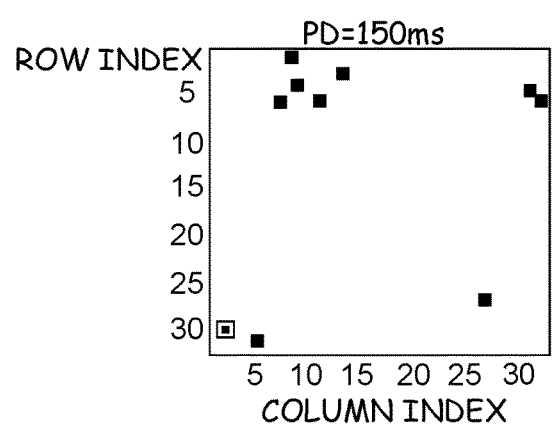

For a better understanding of the proposed technique, FIGS. 7(a)-7(h) show data remanence of a small 1 kbit sub-array for different power down periods. Each of FIGS. 7(a)-7(h) show a bit map for the sub-array with each cell in the array being represented by a box at the intersection of a column index shown on the horizontal axis and a row index shown along the vertical axis. FIGS. 7(a)-7(d) show the bit map for selecting stable '1's and FIGS. 7(e)-7(h) show the bit map for selecting stable '0's. In FIGS. 7(a)-7(h), cells with an output state of '1' are shown in white and cells with an output state of '0' are shown in black. For FIGS. 7(a)-7(d) all of the cells in the array are set to state Q=0 and then the power supply is reduced, letting the data stored in the SRAM to decay. For FIGS. 7(a), 7(b), 7(c) and 7(d), the power is then returned to VDD after respective time periods of 130 ms, 140 ms, 150 ms, and 160 ms. In FIG. 7(a), it can be seen that only a single cell (strongest '1') flipped during the 130 ms of reduced power. This cell corresponds to the most stable '1' cell in this array. When the power down period increases further, more and more cells flip, which are the next most stable '1' cells. A similar effect can be seen in FIGS. 7(e)-7(h) for the most stable '0' cells. Thus, the length of the power down period determines how many stable cells can be identified after power is returned. Depending on how many stable bits are needed for the hardware security task, we can vary the power off period. For example, for a task that requires 256 bits, roughly 128 stable '0' cells and 128 stable '1' cells are selected from the array of memory cells. For an array of 512,000 cells, this would be 0.05% of the total cells available. In accordance with one embodiment, 128 stable '0' cells and 128 stable '1' cells can be identified using a power off period of around 185 ms. If 512 bits are needed for the hardware security task, the power off period is increased so that 256 stable '0' cells can be identified and 256 stable '1' cells can be identified. In accordance with one embodiment, the power down period is lengthened to 195 ms to identify the 512 most stable cells. In some embodiments, more stable cells are identified than are required for the hardware security task and then the needed number of stable bits are selected from the identified stable cells. This helps to further hide which of the memory cells are actually being used in the hardware security task.

For comparison, we used the conventional TMV method to attempt to find stable bits in a SRAM array. 1,000 power-up tests were performed and the probability of each cell being '1' or '0' were calculated. We found that 40% of the cells are stable '1' through all 1,000 tests and 41% of the cells are stable '0' all the time. However, many of the allegedly stable cells will show unstable behavior at different voltage and temperature conditions, or when the SRAM is subject to aging. To determine the 256 most stable bits from a 512 kbit SRAM array, which is only 256/512 k=0.05%, we may need millions of repetitive power up tests for TMV, which is impractical.

Three operations are performed to utilize SRAM data remanence in hardware security. First, a test chip containing an instance of the SRAM memory array is tested to determine the number of stable memory cells that can be identified for respective different power down time periods. Second, for each SRAM memory array that is produced, the addresses of the stable cells are identified by using the appropriate power down time period determined from the test SRAM for the desired number of stable cells. Third, when the hardware security task is being performed, the SRAM memory array is powered down and then is powered up and the values of the memory cells at the addresses determined in the second step are read and are used in the hardware security task.

Figure 8:
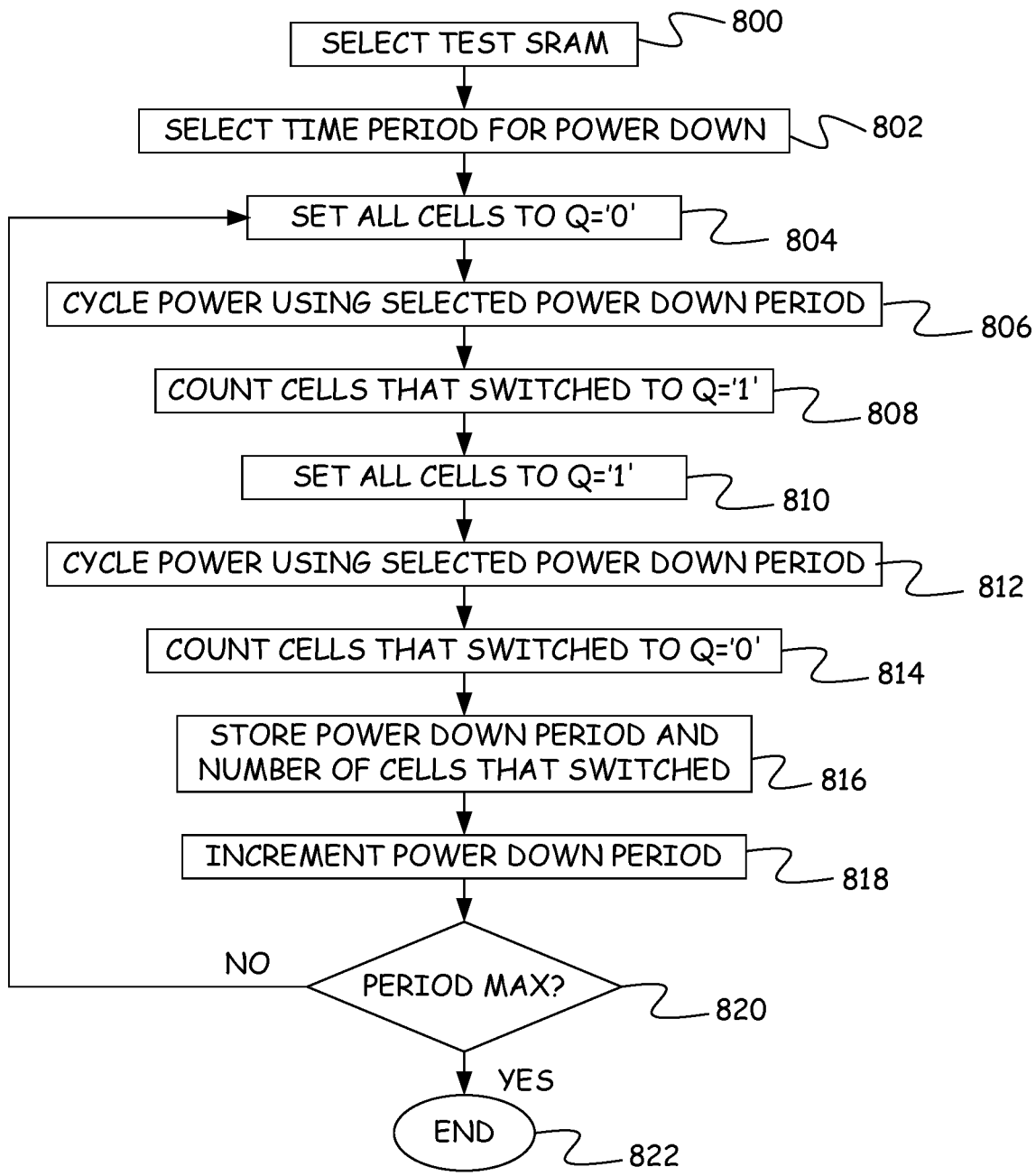
FIG. 8 provides a flow diagram of a method for determining the number of stable memory cells that can be identified for each of a collection of power down periods.
Figure 9:
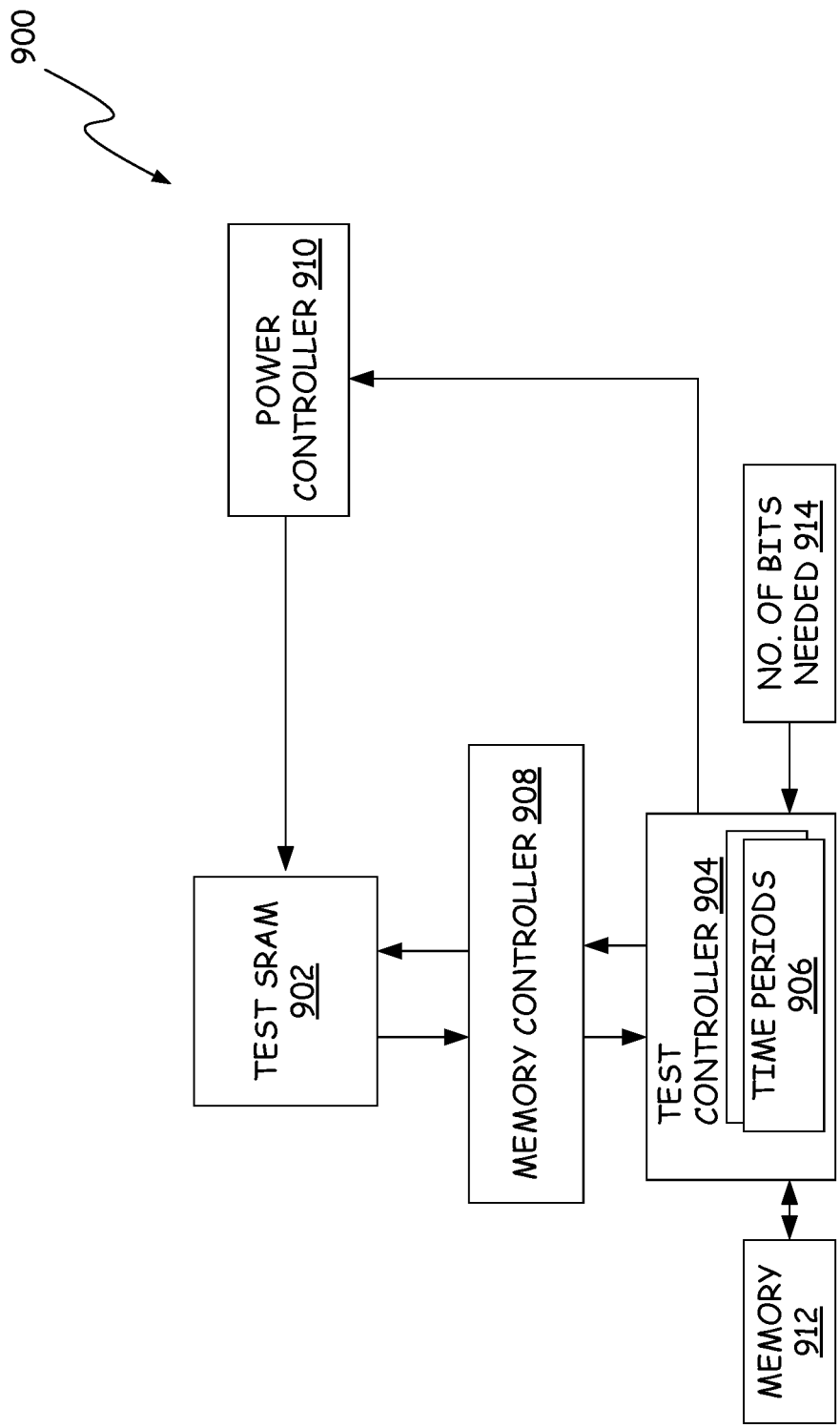
FIG. 9 provides a block diagram of a system for testing an array of memory cells using the methods of FIGS. 8 and 10.

FIG. 8 provides a flow diagram of a method for testing a test SRAM to characterize the number of stable memory cells that can be found for each of a collection of different power down periods. FIG. 9 provides a block diagram of a system 900 used to perform the method of FIG. 8. In step 800, of FIG. 8 a test SRAM 902 is selected. In accordance with one embodiment, test SRAM 902 is manufactured using the facilities and processes that will be used to manufacture the SRAMs that will be used to perform the hardware security tasks and can be a manufactured as the only device on a chip or as part of a chip containing other devices. Test SRAM 902 includes an array of memory cells that can be individually addressed. At step 802, a test controller 904 selects a smallest time period 906 for the power down. At step 804, test controller 904 instructs a memory controller 908 to perform write operations on all of the memory cells of test SRAM 902 so that all of the memory cells are set to Q='0'. Once the write operations are complete, test controller 904 instructs a power controller 910 to reduce power to test SRAM 902 for the selected power down period at step 806. In accordance with one embodiment, power controller 910 is connected to the power input of test SRAM 902 and is able to provide varying voltage levels based on instructions from test controller 904. After the power has been returned to test SRAM 902, test controller 904 instructs memory controller 908 to read all of the memory cells in test SRAM 902. With each cell that is read, memory controller 908 provides the value read from the memory cell to test controller 904, which counts the number of SRAM cells that switched to Q='1' (the stable '1' cells) at step 808.

At step 810, test controller 904 instructs memory controller 908 to perform write operations on all of the memory cells of test SRAM 902 so that all of the memory cells are set to Q='1'. Once the write operations are complete, test controller 904 instructs power controller 910 to reduce power to test SRAM 902 for the selected power down period at step 812. After the power has been returned to test SRAM 902, test controller 904 instructs memory controller 908 to read all of the memory cells in test SRAM 902. With each cell that is read, memory controller 908 provides the value read from the memory cell to test controller 904, which counts the number of SRAM cells that switched to Q='0' (the stable '0' cells) at step 814. At step 816, test controller 904 stores the total number of SRAM cells that switched (the stable cells), either from '0' to '1' or from '1' to '0', in a memory 912 together with the time period for the power down. At step 818, test controller 904 increments the power down period 906 and at step 820, test controller 904 compares the incremented power down period to a maximum power down period. If the incremented power down period is less than the maximum power down period, the process of FIG. 8 returns to step 804 to repeat steps 804-820 for the incremented power down period and thereby determine and store a count of the cells that switched (the stable cells) for the incremented power down period. When the incremented power down period reaches the maximum power down period at step 820, the process of FIG. 8 ends at step 822.

Figure 10:
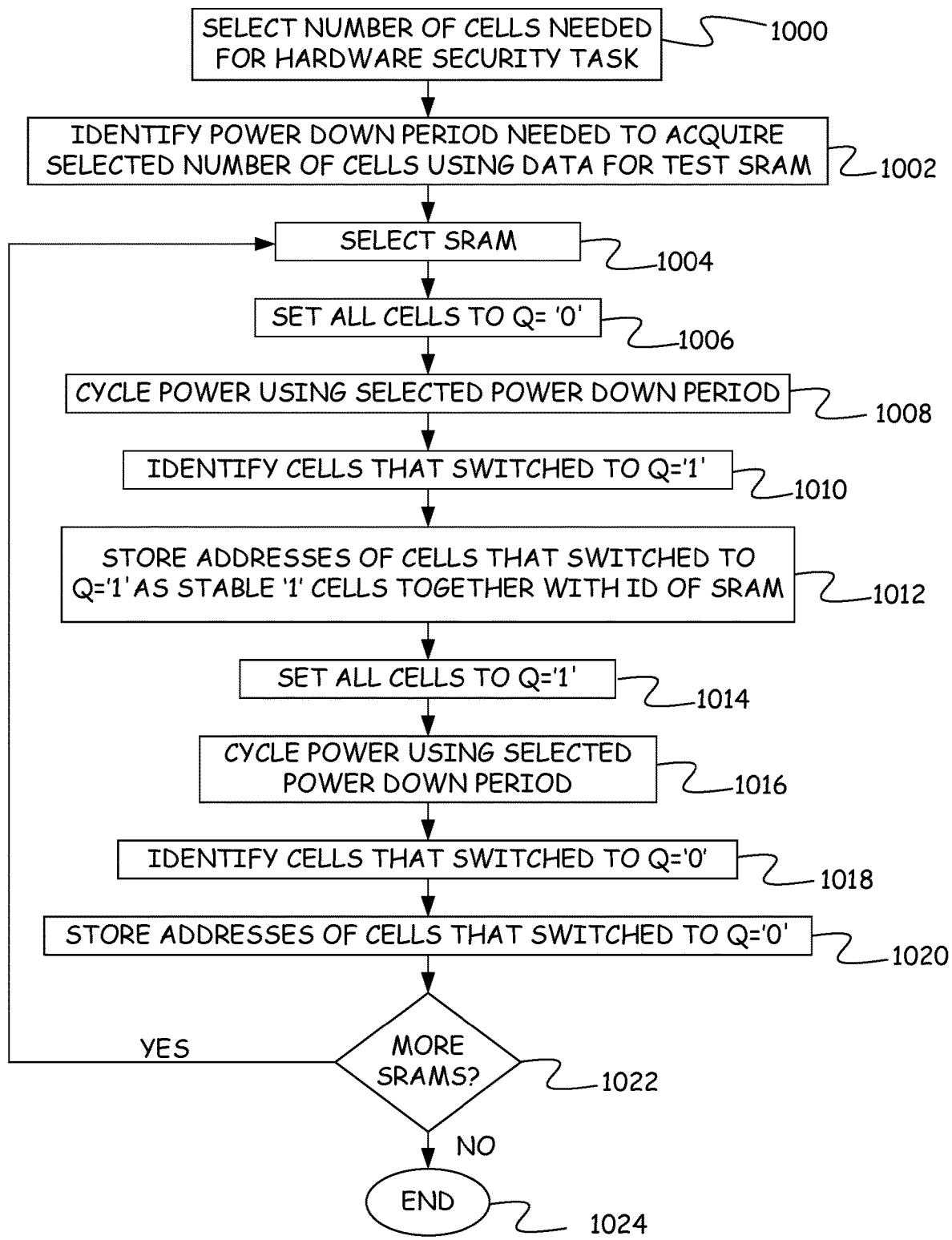
FIG. 10 provides a flow diagram of a method for identifying a desired number of addresses for stable memory cells in an array of memory cells.

FIG. 10 provides a flow diagram of a method of performing the second operation of identifying the addresses of stable cells in each SRAM that is produced. In step 1000 of FIG. 10, the number of bits 914 that are needed for the hardware security task is identified and is provided to test controller 904. The number of needed bits 914 corresponds to the minimum number of stable cells that must be identified in every produced SRAM in order to execute the hardware security task. At step 1002, test controller 904 searches memory 912 to identify a stored power down time period that produced the needed number of stable memory cells 914 in the method of FIG. 8. In some embodiments, the shortest time period that will produce the needed number of stable cells is selected. In other embodiments, a time period that will produce more than the needed number of stable cells is selected to ensure that the needed number of stable cells will be identified in each SRAM and to obscure which stable cells are actually being used in the hardware security task.

At step 1004, one of the manufactured SRAMs is selected as test SRAM 902. The selected SRAM has the same construction as the test SRAM used in the method of FIG. 8. At step 1006, test controller 904 instructs memory controller 908 to perform write operations on all of the memory cells of test SRAM 902 so that all of the memory cells are set to Q='0'. Once the write operations are complete, test controller 904 instructs power controller 910 to reduce power to test SRAM 902 for the selected time period at step 1008. After the power has been returned to test SRAM 902, test controller 904 instructs memory controller 908 to read all of the memory cells in test SRAM 902. With each cell that is read, memory controller 908 provides the value read from the memory cell and an identifier of the memory cell to test controller 904. In accordance with one embodiment, the identifier of the memory cell is the address of the memory cell used to read and write from the memory cell. At step 1010, test controller 904 identifies which memory cells switched to Q='1' and stores the identifiers of those memory cells at step 1012 as stable '1' cells together with an identifier for test SRAM 902, which in some embodiments is an identifier for the chip that test SRAM 902 is built on.

At step 1014, test controller 904 instructs memory controller 908 to perform write operations on all of the memory cells of test SRAM 902 so that all of the memory cells are set to Q='1'. Once the write operations are complete, test controller 904 instructs power controller 910 to reduce power to test SRAM 902 for the selected time period at step 1016. After the power has been returned to test SRAM 902, test controller 904 instructs memory controller 908 to read all of the memory cells in test SRAM 902. With each cell that is read, memory controller 908 provides the value read from the memory cell and the identifier of the memory cell to test controller 904. At step 1018, test controller 904 identifies which memory cells switched to Q='0' and stores the identifiers of those memory cells at step 1020 as stable '0' cells together with the identifier for test SRAM 902.

In accordance with some embodiments, when test controller 904 stores an identifier for a memory cell at step 1012 or step 1020, test controller 904 is selecting which of the stable cells to use in a hardware security task. In some embodiments, test controller 904 saves the identifiers of all of the stable '1' cells and all of the stable '0' cells and thereby selects all of the stable '1' cells and all of the stable '0' for use in the hardware security task. In other embodiments, test controller 904 only stores identifiers for a subset of the identified stable '1' cells and a subset of the identified stable '0' cells and thus only selects a subset of the identified stable cells for use in the hardware task.

At step 1022, test controller 904 determines if there are more SRAMs to be processed. If there are more SRAMs, the process returns to step 1004 to select the next SRAM to be used as test SRAM 902 and steps 1006-1020 are repeated for the newly selected test SRAM. When all of the SRAMs have been processed at step 1022, the process ends at step 1024.

In the discussion above, the same components used to identify the counts of stable cells for different power down periods were also used to identify the address of stable cells in various SRAMs. In other embodiments, separate testing hardware is used to perform the methods of FIGS. 8 and 10. In particular, in some embodiments, the power down time period needed to identify a sufficient number of stable cells is read from memory 912 located on a server operated by a SRAM designer and is transmitted to a testing device located at a SRAM manufacturing plant where the process of FIG. 10 is performed. The resulting addresses for the stable '1' and stable '0' cells of each tested SRAM and the identifier for each SRAM can be sent from the SRAM manufacturing plant to the server operated by the SRAM designer.

Figure 11:
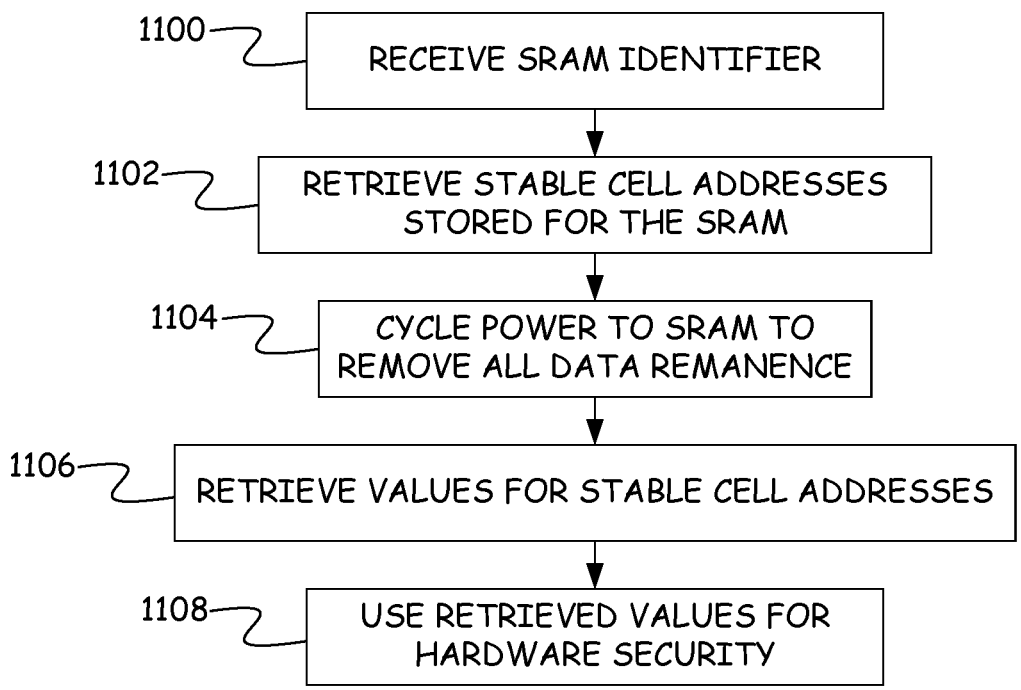
FIG. 11 provides a method of utilizing stable memory cells in an array of memory cells to perform a hardware security task.
Figure 12:
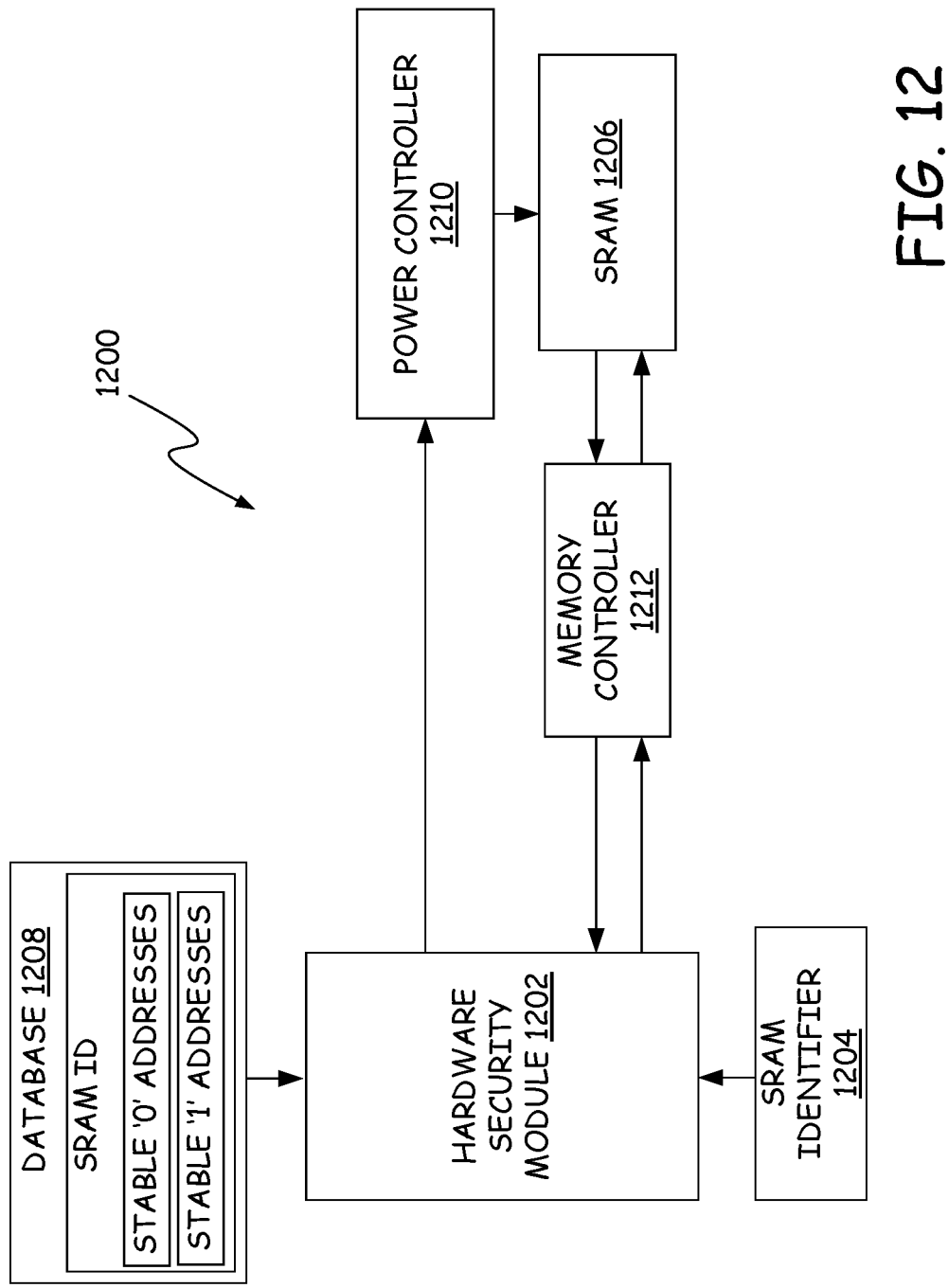
FIG. 12 provides a block diagram of a system for performing the method of FIG. 11.

FIG. 11 provides a flow diagram of a method of utilizing a SRAM for a hardware security task after the SRAM has been processed using the method of FIG. 11. FIG. 12 provides a block diagram of a system for utilizing the SRAM in the hardware security task. In step 1100, a hardware security module 1202 receives an identifier 1204 for a SRAM 1206. In some embodiments, hardware security module 1202 is executed by a server operated by the designer of the chip containing SRAM 1206 and SRAM identifier 1204 is sent by a server operated by the owner of SRAM 1206 or some other entity that wants to invoke hardware security task 1204. At step 1102, hardware security module 1202 uses SRAM identifier 1204 to search a database 1208 to recover the identifiers of the stable '1' cells and stable '0' cells stored for SRAM 1206. At step 1104, hardware security module 1202 sends an instruction that causes a power controller 1210 reduce power to SRAM 1206 for a period of time that is sufficient to remove all data remanence from the memory cells of SRAM 1206 such that roughly half of the SRAM cells are '0' and half are '1' when power is returned.

At step 1106, hardware security module 1202 instructs memory controller 1212 to read the values of the stable cells based on the cell identifiers retrieved from database 1208. In accordance with some embodiments, hardware security module 1202 instructs memory controller 1212 to only read the memory cells at the addresses provided by database 1208. In other embodiments, hardware security module 1202 instructs memory controller 1212 to read all of the memory cells in SRAM 1206, but then hardware security module 1202 only processes the values from the stable cells.

At step 1108, the values read from the stable cells are used for the hardware security task. In most embodiments, the values read from the stable cells are applied to a security function as secret keys. In accordance with one embodiment, step 1108 involves comparing the read values to how the stable cells were designated, stable '0' or stable '1', in steps 1012 and 1020 of FIG. 10. If the read value for a stable '0' cell is '1' or if the read value for a stable '1' cell is '0', the chip may not be the same chip that was characterized in the method of FIG. 10. In other embodiments, step 1108 involves assigning each stable cell to an input of a security function and executing the security function twice. During the first execution, the values of the stable cells determined in the method of FIG. 10 are applied to the inputs of the security function to produce a first output value. During the second execution, the values of the cells read at step 1106 of FIG. 11 are applied to the inputs of the security function to produce a second output value. The two output values are then compared to each other.

In the discussion of FIGS. 8-11, the methods have been described with reference to a single hardware task. In other embodiments, stable cells may be identified for multiple different hardware tasks that each requires a different number of stable cells. For such embodiments, the methods of FIGS. 10 and 11 are repeated for each hardware security task to identify a separate set of stable memory cells for each hardware security task. For example, FIGS. 10 and 11 can be performed for a first hardware security task that requires 256 stable memory cells and then can be repeated for a second hardware security task that requires 512 stable memory cells.

An attractive feature of the methods discussed above is that they can be performed at any temperature. The top 0.05% stable cells found in the method of FIG. 10 will remain stable at different temperatures and voltage conditions.

2. Results

This section shows detailed measurement results verifying that the stable cells selected using our proposed technique are indeed stable across different environmental and aging conditions. In the testing, a pulsed power supply and other digital signals are provided by a PXI based data acquisition system. GPIB controlled power supplies were used to stress the chip. Chips were measured inside a temperature controlled chamber.

2.1 Uniqueness of Key

During testing, respective power down periods were selected to identify 256, 512, and 1024 stable cells. Each SRAM chip that was tested had 512,000 cells in total, so when identifying 256 stable cells the goal is to select the 128 most stable '1's and the 128 most stable '0's from the 512,000 cells, which correspond to the most stable 0.05% of the cells. The power supply off period for selecting 256 stable cells in one test was determined to be about 190 ms. Alternatively, more than 256 stable cells can be identified and 256 cells can be picked from the identified stable cells.

FIGS. 13(a), 13(b), 13(c) and 13(d) shows 256-bit keys generated from 4 different respective SRAMs. The 256-bit keys are formed by ordering identified stable cells based on their addresses and setting the values of each stable cell to its respective stable value (white=stable value of '1', black=stable value of '0'). The 256-bit keys shown in FIGS. 13(a)-13(d) have average Hamming distance of 0.4935 between each other, confirming the uniqueness of the stable cell addresses between SRAMs.

2.2 Effect of Power Ramp Up Time and Temperature

Figures 14A, 14B, 14C:
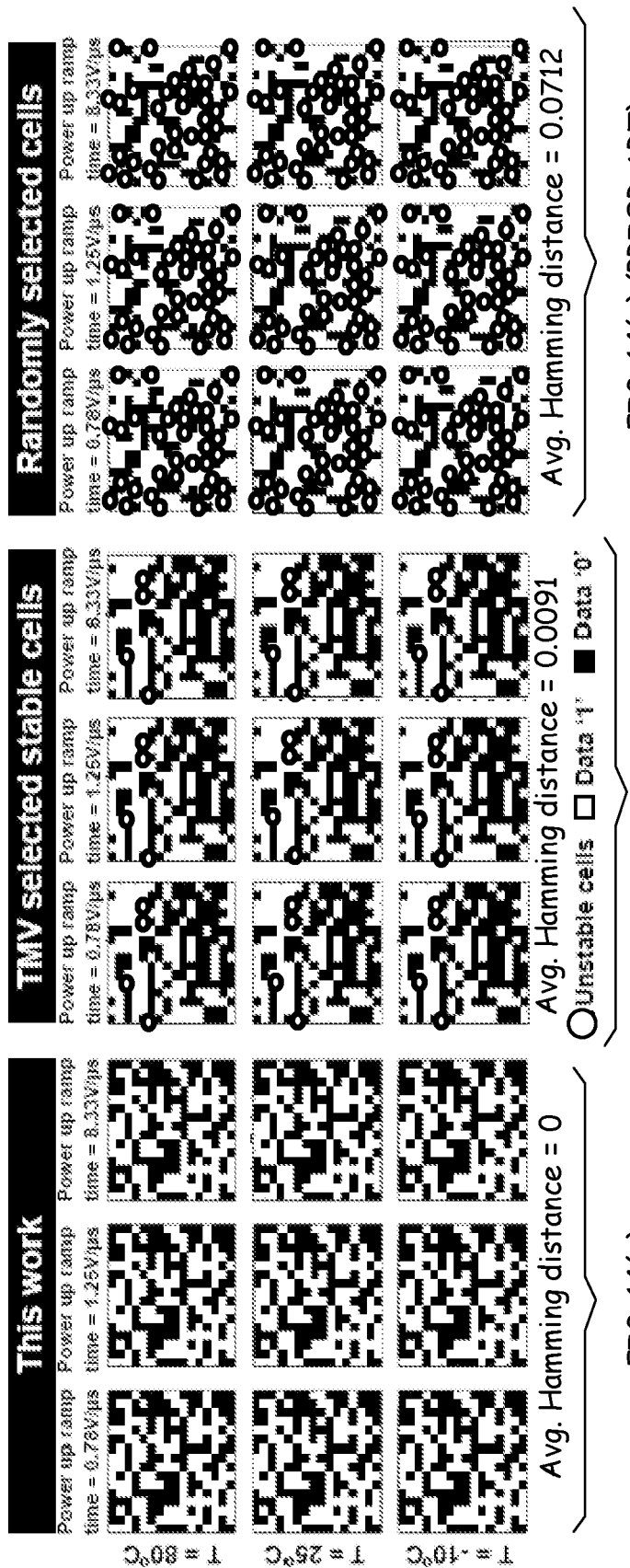
FIG. 14($a$) shows maps of value read from stable memory cells determine in accordance with one embodiment under various combinations of temperature and power up rate.

To verify that keys selected using some embodiments are stable under different environmental conditions, the voltage ramp up rate and temperature were varied. Note that during the SRAM power up, the state is resolved during the very beginning of the power supply ramp up, so the final power supply level will not affect the stability of the SRAM PUF. Instead, the ramp up rate of the power supply may have an effect on the stability of the responses. To evaluate this effect, the ramp up rate of the supply voltage was changed from 0.78 μV/s to 8.33 μV/s. Testing was performed at three temperatures: 80° C., 25° C. and −10° C. FIG. 14(a) provides read values for the stable cells of a SRAM under each of the different combinations of temperature and ramp up rate listed above. Each large square in FIG. 14(a) shows the values read from the stable cells of the SRAM (white='1', black='0'). Power up tests were repeated 10 times under each condition to ensure that the responses were absolutely stable. Since the responses are always stable, there is no need for further processing of the responses using ECC. This reduces the circuit complexity and communication overhead. As shown in FIG. 14(a), the identified stable cells produce the same output after every power up regardless of the tested temperature or ramp-up rate. Thus, the SRAM output for the different test conditions has an average Hamming Distance of 0.

For comparison, we also selected 256 cells using the TMV method of the past based on 1,000 repetitive power ups. That is, we only chose the cells that are consistently '0' or consistently '1' throughout the entire 1,000 trials. As mentioned earlier, even with 1,000 repetitive power up tests, we are only able to discriminate the top 81% stable cells which includes marginally stable cells. As a reminder, the proposed data remanence technique can select the top 0.05% stable cells with just two power-up tests. The responses using the 1,000 trial TMV method for each combination of ramp up rate and temperature discussed above are shown in FIG. 14(b). The unstable bits are circled. It can be seen from the cell maps that 4 cells are unstable when the temperature or power supply ramp up rate changes, which is not acceptable for ECC-less key generation. Finally, the power up responses from 256 randomly selected SRAM cells under the different combinations of temperature and ramp up rate are shown in FIG. 14(c). As expected, many cells are unstable when tested under different conditions. These measurement results confirm that the data remanence technique proposed in this paper can reliably identify the most stable cells in an SRAM array with only two power-up tests. The stable cells can be selected under the nominal voltage and room temperature condition, so it can greatly reduce the test cost and test time. We also selected the 512 most stable cells and 1024 most stables cells and their responses were proven to be 100% stable under various voltage and temperature conditions, confirming the effectiveness of this technique.

2.3 Effect of Device Aging

Device aging may cause the PUF response to change over the lifetime of a product, which is undesirable. In particular, bias temperature instability (BTI) is known to be the dominant aging mechanism in SRAM cells due to the low activity factor and DC stress nature. BTI manifests as an increase in threshold voltage, and occurs when PMOS or NMOS transistors are biased with a negative or positive gate voltage, respectively. Depending on the data stored in the SRAM cell during stress, BTI can either emphasize or de-emphasize the process variation induced mismatch. Emphasizing the mismatch will harden the responses and make them more stable, while de-emphasizing the mismatch will have the opposite effect. Since our goal is to verify the stability under the worst case condition, we stressed the SRAM array with the power-up state that will decrease the mismatch between the two cross-coupled inverters. This de-emphasizes the mismatch and makes the bits more unstable during the actual power up test. The SRAM chips were stressed under a static DC condition (i.e., no switching or toggling) for 72 hours using a 1.5×VDD supply voltage. Before applying the stress voltage, the fresh PUF response is read out for reference. The SRAM PUF responses of the selected 256/512/1024 most stable cells are read out every hour and the Hamming distances are calculated against the fresh response.

FIG. 15 shows graphs 1500, 1502 and 1504 of Hamming distance versus stress time. Graph 1500 is the Hamming distance for the stable cells identified using the techniques described above. As shown, the Hamming distance remains at zero for all stress times. For comparison, the Hamming distances of stable cells selected using the TMV method versus stress time are shown in graph 1502 and the Hamming distances of randomly selected cells versus stress time is shown in graph 1504. The graphs show that the stable cells selected using the various embodiments are 100% stable throughout the entire stress experiment. TMV leads to 8% bit flips at the end of the 72 hour stress period, while random selection leads to 15% bit flips at the end of the 72 hour stress period.

Figure 16:
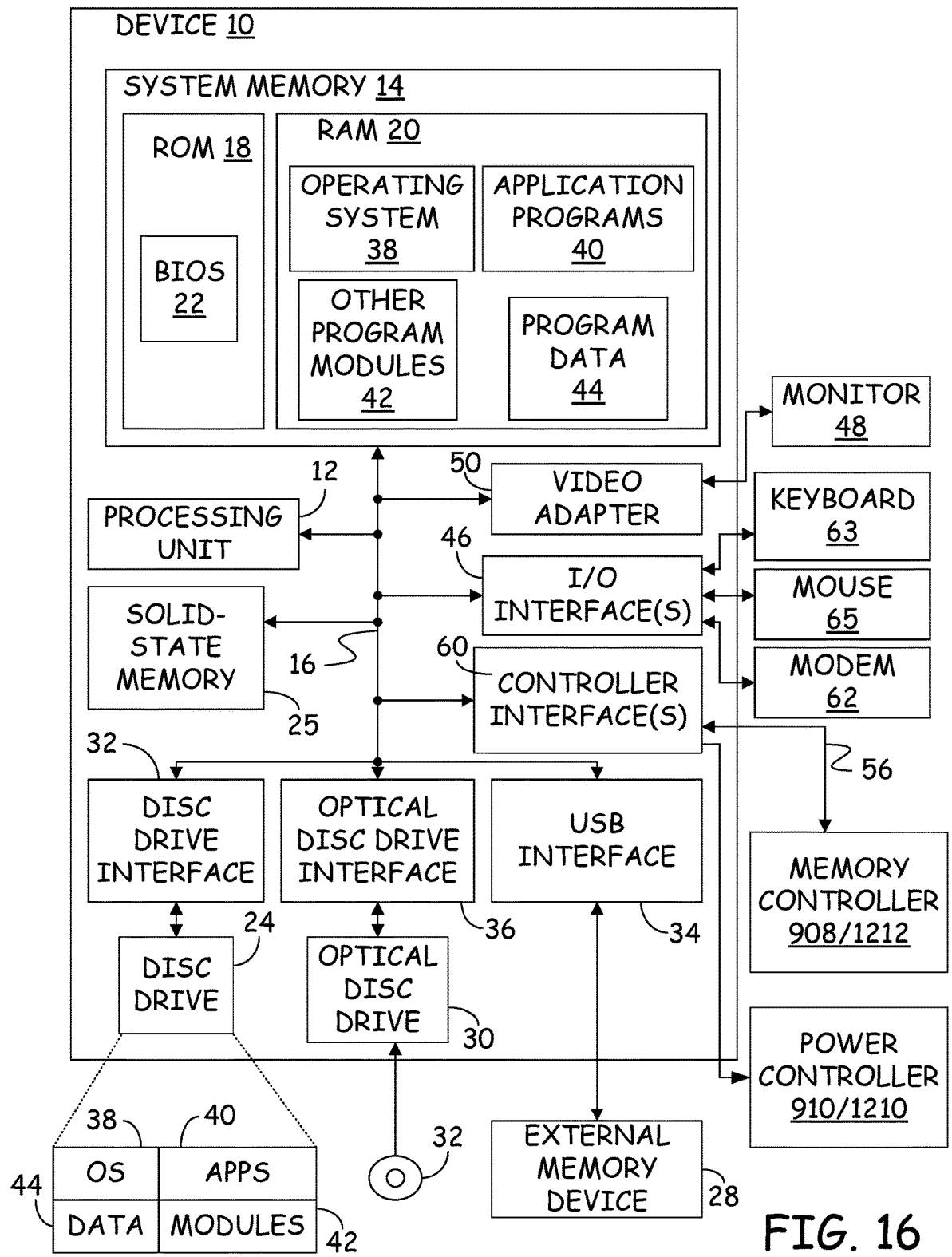
FIG. 16 provides a block diagram of a test controller or hardware security module in accordance with one embodiment.

An example of a computing device 10 that can be used as test controller 904 and/or hardware security module 1202 is shown in the block diagram of FIG. 16. For example, computing device 10 may be used to perform any of the steps described above. Computing device 10 of FIG. 16 includes a processing unit (processor) 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, embedded PXI controllers, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above. Program data can include any data used in the steps described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 connects to memory controllers, such as memory controllers 908 and 1212, and to power controllers, such as power controllers 910 and 1210, through controller interfaces 60. In accordance with one embodiment, controller interfaces 60 are PCI or PXI interfaces.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
    setting an output of each memory cell in an array of memory cells to a same first value;
    decreasing power to the array of memory cells;
    waiting a period of time;
    increasing power to the array of memory cells;
    examining the outputs of the memory cells and identifying as being eligible to be used to provide consistent outputs in hardware security, all memory cells in the array of memory cells whose outputs switched to a second value different from the first value in response to decreasing and then increasing the power;
    selecting from the identified memory cells, a set of memory cells to use in hardware security;
    wherein the period of time is set through steps comprising:
    selecting a proposed time period;
    writing a first value to all memory cells of a test set of memory cells;
    reducing power to the test set of memory cells for the proposed time period and then restoring power to the test set of memory cells;
    reading all of the memory cells in the test set of memory cells;
    identifying which memory cells switched to contain a second value different than the first value;
    counting the identified memory cells that switched to contain the second value;
    writing the second value to all of the memory cells in the test set of memory cells;
    reducing power to the test set of memory cells for the proposed time period and then restoring power to the test set of memory cells;
    reading all of the memory cells in the test set of memory cells;
    identifying which memory cells switched to contain the first value;
    counting the identified memory cells that switched to contain the first value;
    summing the count of the identified memory cells that switched to contain the second value and the count of the identified memory cells that switched to contain the first value to produce a total count for the proposed time period; and
    determining that the total count for the proposed time period exceeds a desired number of memory cells and in response setting the proposed time period as the period of time.

2. The method of claim 1 further comprising storing identifiers for the selected set of memory cells to use in hardware security and an identifier for the array of memory cells.

3. The method of claim 2 further comprising performing a hardware security task by receiving the identifier for the array of memory cells, retrieving the stored identifiers for the selected set of memory cells based on the received identifier for the array of memory cells, requesting values of the outputs of memory cells having the retrieved identifiers, and using the requested values to perform the hardware security task.

4. The method of claim 3 wherein requesting the values of the outputs of memory cells having the retrieved identifiers comprises requesting the values of the outputs formed in response to the power to the array of memory cells being increased.

5. The method of claim 1 further comprising:
    setting the output of each memory cell in the array of memory cells to the second value;
    decreasing power to the array of memory cells;
    increasing power to the array of memory cells;
    identifying memory cells in the array of memory cells with outputs that switched to the first value in response to decreasing and then increasing the power;
    selecting from the identified memory cells with outputs that switched to the first value, a second set of memory cells to use in hardware security.

6. A system comprising:
    a memory comprising a plurality of memory cells;
    a memory controller coupled to the memory;
    a power controller coupled to the memory and controlling an amount of power provided to the memory; and
    a test controller coupled to the memory controller and the power controller, the test controller applying tests to memory cells of the memory through the memory controller and the power controller to identify a time period, during which no power is provided to the memory, needed to change an output state of a desired number of memory cells in the memory while retaining data remanence in other memory cells;
    wherein the controller applies tests to the memory through steps comprising:
    selecting a time period;
    instructing the memory controller to write a first value to all memory cells of a set of memory cells in the memory;
    instructing the power controller to reduce power to the set of memory cells for the selected time period and then restore power to the set of memory cells;
    instructing the memory controller to read all of the memory cells in the set of memory cells;
    identifying which memory cells switched to contain a second value different than the first value;
    counting the identified memory cells that switched to contain the second value;

instructing the memory controller to write the second value to all of the memory cells in the set of memory cells;

instructing the power controller to reduce power to the set of memory cells for the selected time period and then restore power to the set of memory cells;

instructing the memory controller to read all of the memory cells in the set of memory cells;

identifying which memory cells switched to contain the first value;

counting the identified memory cells that switched to contain the first value, summing the count of the identified memory cells that switched to contain the second value and the count of the identified memory cells that switched to contain the first value to produce a total count for the time period; and comparing the total count for the time period to the desired number of memory cells.

7. The system of claim 6 further comprising a hardware security module that performs steps comprising:

receiving a unique identifier associated with a memory;

retrieving addresses of stable cells in the memory using the unique identifier associated with the memory;

receiving values read from the addresses of the stable cells; and performing a hardware security function using the values read from the addresses of the stable cells.

8. The system of claim 7 wherein the stable cells comprise memory cells that switch output states when power is reduced to the stable cells for the period of time.

9. The system of claim 8 wherein the test controller applies tests to the memory to identify a second time period, during which no power is provided to the memory, needed to change an output state of a second desired number of memory cells in the memory and wherein the hardware security module retrieves addresses of stable cells in memory using the unique identifier associated with the memory and a number of stable cells needed for the hardware security function.

10. A method of identifying stable memory cells comprising:

reducing power to a set of memory cells for a time period and then increasing power to the set of memory cells, wherein the time period limits how many memory cells have different output values after the power is increased compared to before the power is reduced by retaining data remanence in at least one memory cell;

storing the addresses of all memory cells that had different output values after the power is increased compared to before the power is reduced as stable memory cells; and selecting the stable memory cells to use in a hardware security task;

wherein the time period is set through steps comprising:

selecting a proposed time period;

writing a first value to all memory cells of a test set of memory cells;

reducing power to the test set of memory cells for the proposed time period and then restoring power to the test set of memory cells;

reading all of the memory cells in the test set of memory cells;

identifying which memory cells switched to contain a second value different than the first value;

counting the identified memory cells that switched to contain the second value;

writing the second value to all of the memory cells in the test set of memory cells;

reducing power to the test set of memory cells for the proposed time period and then restoring power to the test set of memory cells;

reading all of the memory cells in the test set of memory cells;

identifying which memory cells switched to contain the first value;

counting the identified memory cells that switched to contain the first value, summing the count of the identified memory cells that switched to contain the second value and the count of the identified memory cells that switched to contain the first value to produce a total count for the proposed time period; and determining that the total count for the proposed time period exceeds a desired number of memory cells and in response setting the proposed time period as the time period.

11. The method of claim 10 further comprising:

writing to the set of memory cells to set each memory cell to a different output value than the memory cell had before power was reduced;

reducing power to the set of memory cells again for the time period and then increasing the power to the set of memory cells again; and storing the addresses of memory cells that had different output values after the power is increased again compared to before the power was reduced again as stable memory cells.

12. The method of claim 11 wherein the set of memory cells is subjected to only two cycles of reducing power and then increasing power while identifying stable memory cells.

13. The method of claim 12 further comprising storing an indication of whether each stable memory cell is a stable '1' cell or a stable '0' cell.

14. The method of claim 13 wherein each stable '1' cell will have an output value of '1' when power is reduced to the set of memory cells for at least the time period at a first temperature and when power is reduced to the set of memory cells for at least the time period at a second temperature.

15. The method of claim 14 wherein each stable '1' cell will have an output value of '1' whenever power is reduced to the set of memory cells for at least the time period.

* * * * *